Dec. 31, 1935.  T. SHARP  2,026,003
POTATO COOKING MACHINE
Filed Oct. 24, 1932  2 Sheets-Sheet 1

Inventor
Thomas Sharp
by Otto M. Nermich Atty

Witness
V. Siljander

Dec. 31, 1935.  T. SHARP  2,026,003
POTATO COOKING MACHINE
Filed Oct. 24, 1932  2 Sheets-Sheet 2

Inventor
Thomas Sharp
by Otto M. Hermick Atty

Witness:
V. Siljander

Patented Dec. 31, 1935

2,026,003

UNITED STATES PATENT OFFICE 2,026,003

POTATO COOKING MACHINE

Thomas Sharp, Chicago, Ill., assignor to L. Sherman Aldrich, Winnetka, Ill.

Application October 24, 1932, Serial No. 639,273

28 Claims. (Cl. 53—7)

The invention relates to cooking machines and primarily to that type which is designed to chip and cook potato chips.

The invention has among its principal objects the provision of a machine having a pan for a cooking liquid having a trough and heater elements combined therewith for heating and maintaining a cooking liquid in a heated liquid condition, and having a slicing mechanism located relatively to a certain portion of the trough so that the chips will be deposited at a certain portion of the trough and caused to circulate therefrom to complete the cooking operation.

In addition to the above, it is an object of the invention to provide means such as a pump for creating circulation of the heated liquid or oil and to combine with this means, means for increasing the velocity of flow as of the liquid as it is ejected from the pump, the last mentioned means being arranged adjacent the location at which the chips are introduced to the trough.

Another object of the invention is to provide means for regulating the discharge of the cooking liquid from the pump to thereby regulate the speed of travel of the liquid in the pan.

The invention has as a further object the provision of a rotatable hopper having a stationary blade or knife associated therewith so that upon rotation of the hopper, the commodity contained therein will be presented to the knife and be sliced and deposited at a certain prescribed portion of the trough in which the heated cooking liquid circulates.

An additional object of the invention is to employ the element which carries the slicer as means for retaining the articles to be sliced within the hopper during rotation.

Another object of the invention is to provide means for extracting the chips after the cooking operation has been completed and to provide means to control the period of cooking, this means being operable to control feeding of the chips to the means for extracting the chips from the trough.

Another object of the invention is to provide means whereby the operation of the slicer may be arrested without interfering with the operation of any of the other elements of the machine.

The invention has these and other objects, all of which will be explained in detail and more readily understood when read in conjunction with the accompanying drawings which illustrate one embodiment of which the invention is susceptible, it being manifest that changes and modifications may be resorted to without departing from the spirit of the appended claims forming a part hereof.

In the drawings, wherein like reference characters indicate like or corresponding parts:

Fig. 5 is a plan view of a gear box showing a gear mechanism employed in the device.

Figure 1:
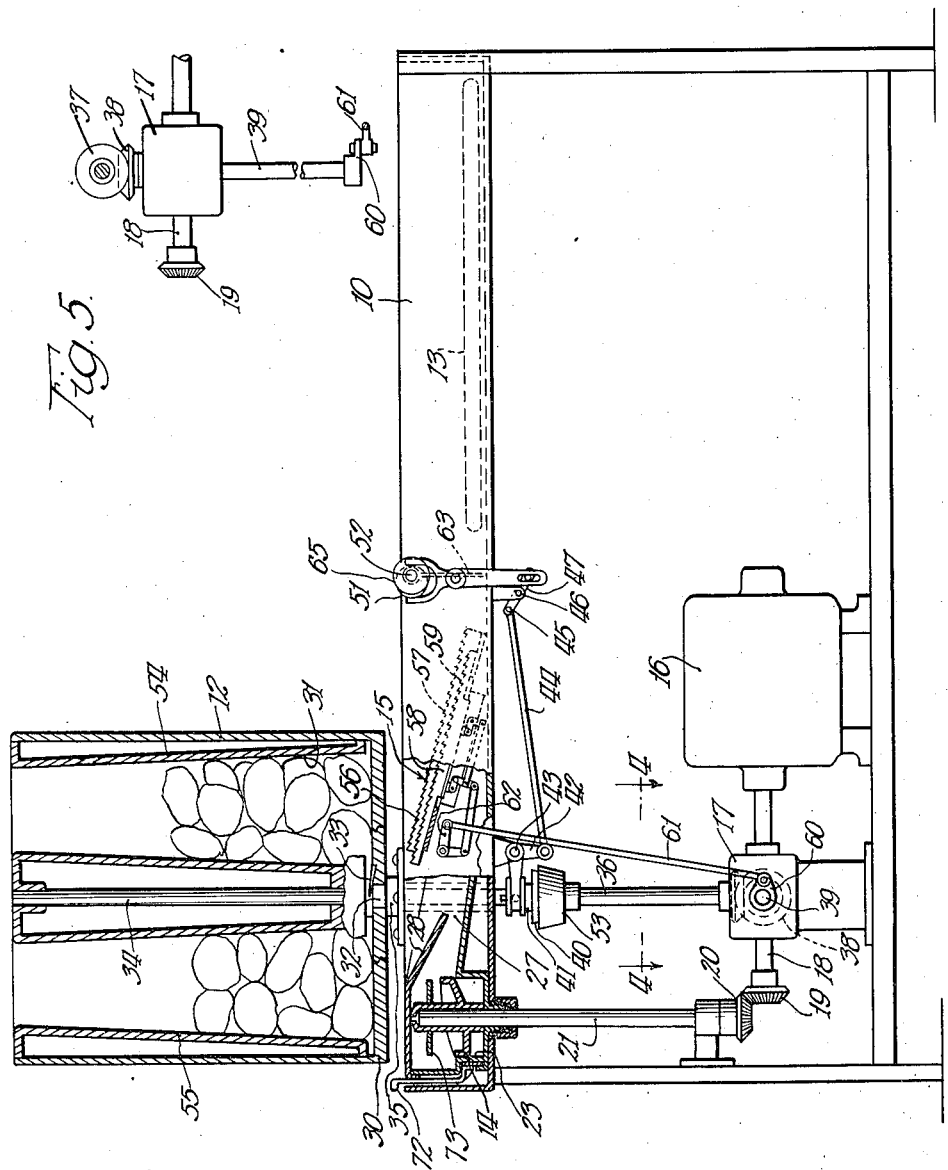
Fig. 1 is a side view partially in section of a machine constructed according to one embodiment of the invention.
Figure 2:
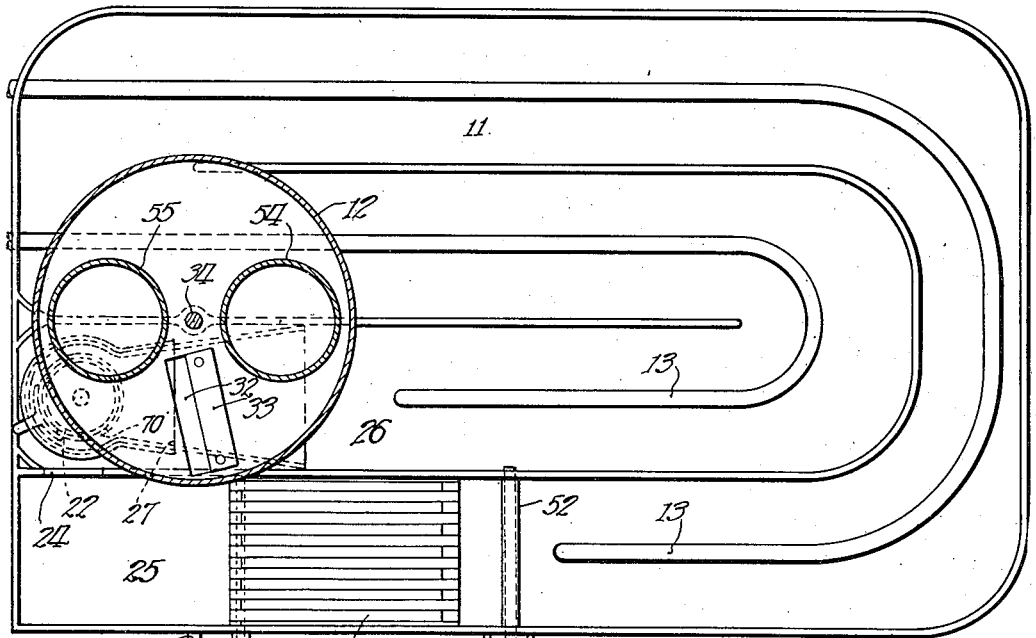
Fig. 2 is a plan view of the structure shown in Fig. 1 certain parts being shown in section.
Figure 4:
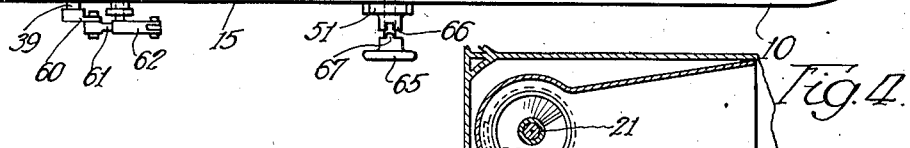
Fig. 4 is a plan view of the structure shown in Fig. 3.
Figure 3:
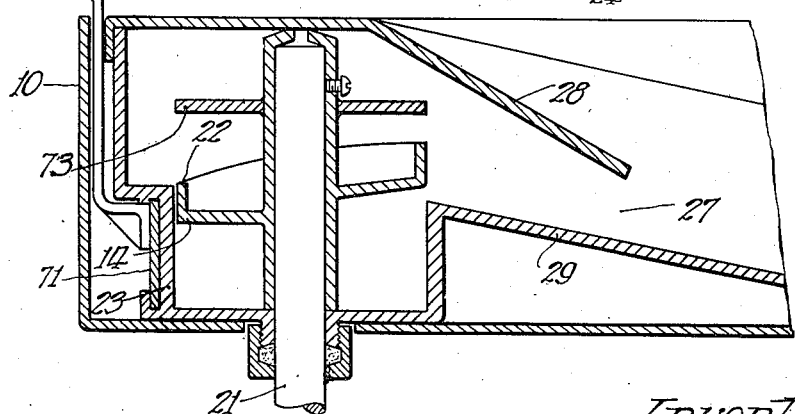
Fig. 3 is a detail sectional view of a pump employed in the structure.

The structure for accomplishing the advantages above referred to contemplates the use of a cooking pan generally designated 10 having a circuitous trough 11, the pan having combined therewith means designated 12 for slicing a commodity such as a potato and depositing chips into the trough. This slicing or chipping mechanism is arranged above the trough, the means for actuating the chipper and actuating certain other devices of the structure being located below the trough. Heat coils 13 are arranged in the trough and are employed to heat the cooking liquid and maintain this liquid in a fluid state.

A pump and pump chamber generally designated 14 is located below and adjacent the slicing mechanism and is arranged in this manner to cause the chips which are deposited into the trough adjacent the pump to be rapidly carried away and circulated through the various channels of the pan.

A pick-up mechanism generally designated 15 is arranged at the termination of the trough and is provided to carry the cooked articles from the trough and eject same into a receptacle provided for this purpose. The pump generally designated 14, an element of the slicer 12 and the pick-up mechanism 15 are all driven through the medium of a motor 16 which is connected with a gear reducing mechanism 17.

The gear reducing mechanism 17 has a shaft 18, which has a beveled gear 19 meshing with a beveled gear 20, the latter being connected to the pump shaft 21 to actuate the impeller 22 of the pump. The impeller 22 of the pump is arranged in a chamber 23 which communicates through an opening such as 24 with the trough to thus withdraw the cooking liquid from one portion of the trough such as that designated 25 and deliver the cooking liquid to the section 26 of the trough.

A means for increasing the velocity of the cooking liquid is provided and associated with the pump chamber 23. This means for increasing the velocity of the cooking liquid and assisting its circulation, includes elements which form a restricted opening 27 which in effect provides a nozzle which will increase the velocity of the liquid as it is ejected from the pump and cause circulation of the liquid through the channel of the pan. Specifically, the means for increasing the velocity of the liquid includes the restricted opening and the walls 28 and 29, the latter of which forms a portion of the floor of the channel 26.

As before stated, the slicing or chipping mechanism employed is located relatively to the means for increasing the velocity of the oil so that as the chips are deposited at this portion of the pan, same will be rapidly carried away from the slicing or chipping device and prevent clogging or piling up of chips at this point.

The slicing or chipping mechanism generally designated 12 contemplates the use of a cylindrical stationary element 30 which is closed at its lower end and provides a housing for the rotatable hopper 31. The element forming the closure for the lower end of the rotatable element 31 has an opening 32 and a knife blade 33 is located adjacent the opening so that the commodity as sliced is deposited adjacent the opening 27 of the means for increasing the velocity of the cooking liquid.

The rotatable portion of the slicing or chipping device is mounted upon a rotatable shaft section 34, the latter of which is mounted in a stationary bearing 35. The shaft section 34 is driven by the shaft section 36, the latter having a beveled gear 37 which meshes with a beveled gear 38 mounted upon a shaft such as 39 extending from the gear reduction housing 17.

A friction clutch generally designated 40 is provided to releasably engage the shaft sections 34 and 36 with each other. The friction clutch generally designated 40 involves the use of a cone 41 which is keyed and slidably mounted upon the shaft 34, the cone being actuated through a lever mechanism including the bell crank lever 42 which is mounted upon the pivot 43 and has a rod 44 extending from one end thereof. The opposite end of the rod is connected with a lever 45 mounted to rotate with the shaft 46. The shaft 46 has a lever 47 which is operatively connected with the shift lever 48 which is pivoted at 49 and has the forked end 50, the latter being designed to cooperate with the eccentric 51 rotatably mounted upon the shaft 52.

Manifestly, as the cam or eccentric 51 is rotated, this will actuate the shift lever 48 and transmit movement to the bell crank lever 42 which will cause engagement and disengagement of the cone 41 with the female portion of the clutch. Manifestly, the mechanism just described, provides means whereby the shaft 34 and the hopper connected therewith may be selectively operated to control the amount of the commodity fed to the cooking pan.

The rotatable portion 31 of the hopper is provided with a plurality of compartments 54 and 55 which, it will be noted are of a greater area at the lower end than at the upper end thereof and are designed in this manner to assist in maintaining the commodity to be sliced in cooperative relation with the element 30 which forms a closure for the adjacent open end of the compartments such as 54 and 55 and insures slicing of the commodity as the compartments are rotated into cooperative relation with the knife.

As the chips are deposited in the trough adjacent the means for augmenting the circulation of the cooking medium, they are carried away from the chipping device and caused to circulate through the various channels of the pan until the chips reach the pick-up mechanism generally designated 15. This mechanism is located at the termination of the trough portion 25, and may be of any desired construction that herein shown involves the use of a stationary element 56 having teeth 57 and a movable element 58 having teeth 59. The movable element has a movement imparted thereto which will lift the commodity and carry it toward the upper end of the element 56, deposit the commodity upon the element 56 and travel backwardly to repeat this operation which will eventually deposit the commodity into a receptacle provided for this purpose. This pick-up mechanism is actuated by means of the motor 16 and includes a lever 60 which may be connected to the shaft 39. This lever 60 has a link 61 having one end thereof connected with a link 62 which has oscillatory motion imparted thereto through means of the lever 60.

Means is provided for governing the amount of chips fed to the pick-up mechanism 15. This means is shown in Fig. 1 and consists of a perforated gate 63 which is mounted upon a shaft 52 and is designed to be rotated into and out of a path of the chips through the agency of the handle 65 which is keyed to the shaft 64 and provides means for engaging the eccentric or cam 51 to cause its rotation relatively to the shaft 52 and actuation of the clutch 40. The cam or eccentric 51 is provided with a toothed portion 66 with which the teeth 67 of the handle 65 are designed to engage to effect rotation of the cam or eccentric 51.

A means is provided for regulating flow of liquid from the pump. This means is produced by providing the pump cylinder with an opening 70 and a valve element 71 which is operated through the agency of the handle 72, which is arranged so that it is accessible for manipulation by the operator. A guard 73 rotates with the pump element and assists in directing flow of the cooking liquid from the pump chamber 23.

From the foregoing description, it is evident that a means is provided whereby circulation of the cooking liquid is effected having means associated therewith for increasing the velocity of the cooking liquid as it leaves the pump, which causes circulation of the liquid through the channels of the pan. It is further noted that the chipping device is located relatively to the means for increasing the velocity of the cooking liquid so that as the chips are deposited into the liquid, they are immediately carried away and circulated through the channels of the pan. By employing a rotatable hopper in combination with the stationary knife, the chips are deposited at a certain prescribed point relatively to the pan. The stationary element such as 30 of the slicing device provides a closure for the open adjacent ends of the compartments 54 which, as before stated, are formed so as to insure maintaining the commodity to be sliced so that it will be engaged by the knife during rotation of the hopper. It is further evident that by virtue of the clutch 40, the motion of the hopper may be arrested without affecting any other operative portion of the structure. It is also evident that by providing a gate such as 63, feeding of the cooked commodity to the pick-up mechanism 15 may be regulated.

Having thus described the invention what I claim as new and desire to cover by Letters Patent is:

1. In a machine of the kind described the combination of a pan having a trough, means for slicing and feeding a commodity to said trough, means for circulating liquid contained in said trough and means adjacent said first mentioned means for increasing the velocity of flow of said liquid in said trough.

2. In a machine of the kind described the combination of a pan having a trough, means for slicing and feeding a commodity to said trough, a conveyor for conveying a commodity from said trough, means for circulating liquid contained in said trough and means formed in said trough adjacent said first mentioned means for increasing the velocity of flow of said liquid in said trough.

3. In a machine of the kind described the combination of a pan having a trough, means for slicing and feeding a commodity to said trough, a conveyor for conveying said commodity from said trough, a pump having a chamber, said pump providing means for circulating liquid in said trough, said trough having an inclined portion adjacent said pump and said pump being arranged relatively to said inclined portion to discharge liquid upon said inclined portion of said trough.

4. In a machine of the kind described the combination of a pan having a trough, means for feeding a commodity to be cooked to said trough, a conveyor for conveying the cooked commodity from said trough, a pump for pumping and causing circulation of liquid contained in said trough and means contained in said trough located adjacent the feeding means for increasing the velocity of circulation of said liquid at said feeding means.

5. In a machine of the kind described the combination of a pan having a trough, means for feeding a commodity to said trough, a pump for pumping liquid contained in said trough from one portion of said trough to another portion thereof, said pump having a pump chamber and said pump chamber having an outlet having means for increasing the velocity of said liquid as it is discharged from said chamber into said last mentioned portion of said trough.

6. In a machine of the kind described the combination of a pan having a trough, means for feeding a commodity to said trough, a pump for pumping liquid contained in said trough from one portion of said trough to another portion thereof, said pump having a pump chamber and said pump chamber having an outlet having means for increasing the velocity of said liquid as it is discharged from said chamber into said last mentioned portion of said trough and means for feeding a commodity to said trough, said means being located adjacent said means for increasing the velocity of said liquid.

7. In a machine of the kind described the combination of a pan having a trough, means for feeding a commodity to said trough, a pump for pumping liquid contained in said trough from one portion of said trough to another portion thereof, said pump having a pump chamber and said pump chamber having an outlet having means for increasing the velocity of said liquid as it is discharged from said chamber into said last mentioned portion of said trough and means for slicing a commodity and depositing said commodity in said trough, said means being located adjacent said means for increasing the velocity of said liquid.

8. In a machine of the kind described the combination of a pan having a trough, means for slicing and feeding a commodity to said trough, means for circulating liquid contained in said trough and means adjacent said first mentioned means for increasing the velocity of flow of said liquid in said trough, and means for controlling said circulation.

9. In a machine of the kind described the combination of a pan having a trough, means for slicing and feeding a commodity to said trough, means for conveying a commodity from said trough, means for circulating liquid contained in said trough and means located adjacent the slicing means accelerating flow of said liquid and conveying chips away from said slicing means and along said trough.

10. In a machine of the kind described the combination of a pan having a trough, means for slicing and feeding a commodity to said trough, means for conveying a commodity from said trough, a pump having a chamber having an inlet opening communicating with said trough and a restricted outlet opening discharging into said trough and means for regulating operation of said pump.

11. In a machine of the kind described, the combination of a pan having a trough, means for slicing and introducing a commodity to said trough, means for circulating liquid contained in said trough and an inclined wall arranged in said trough and disposed relatively to said first mentioned means to convey the commodity away from said first mentioned means.

12. In a machine of the kind described, the combination of a pan having a trough, means for slicing and feeding a commodity to said trough, means for circulating liquid contained in said trough, means for conveying a commodity from said trough, means for preventing the feeding of said commodity to said conveying means and means for rendering said slicing and feeding means functionally inoperative upon actuation of the means for preventing the feeding of said commodity to said conveying means.

13. In a machine of the kind described, the combination of a pan having a trough, means for slicing and feeding a commodity to said trough, means for circulating liquid contained in said trough, means for conveying a commodity from said trough, means for regulating the feeding of said commodity to said conveying means, a connection between said regulating means and said slicing and feeding means, said connection being operable to render the slicing and feeding means inoperative when said regulating means is actuated to prevent feeding of said commodity to said conveying means and said regulating means being operable independently of said slicing and feeding means.

14. In a machine of the kind described, the combination of a pan having a trough, means for slicing and feeding said commodity to said trough, means for circulating liquid contained in said trough, means for conveying said commodity from said trough, means for rendering said slicing and feeding means and said conveying means functionally inoperative and independent of said means for circulating said liquid.

15. In a machine of the kind described the combination of a pan having a trough, means for slicing a commodity and feeding said commodity to said trough, a chamber in said trough, means in said chamber for circulating liquid in said trough, and said chamber having means for regulating flow of said liquid in said trough relative to the speed of operation of said circulating means.

16. In a machine of the kind described, the combination of a pan having a trough, means for slicing a commodity and feeding said commodity to said trough, means for circulating liquid contained in said trough, means for controlling the feeding of said commodity from said slicing and feeding means, means for conveying said commodity from said trough, means for controlling the feeding of said commodity to said conveying means, and a common operating lever for said controls.

17. In a machine of the kind described, the combination of a pan having a trough, means for slicing and introducing a commodity to said trough, means for circulating liquid contained in said trough, and an inclined wall disposed relatively to said first mentioned means to convey the commodity away from said first mentioned means and toward said trough.

18. In a machine of the kind described, the combination of a pan having a trough, means for slicing and introducing a commodity to said trough, means for circulating liquid contained in said trough, and means disposed relatively to said first mentioned means to convey the commodity away from said first mentioned means and toward said trough.

19. In a machine of the kind described, the combination of a pan having a trough, means for slicing and feeding a commodity to said trough, means for circulating liquid in said trough, and an inclined portion arranged relatively to said slicing and feeding means for causing said commodity to be conveyed away from said first mentioned means.

20. In a machine of the kind described, the combination of a pan having a trough, means for slicing and feeding a commodity to said trough, means rotatable at a constant speed for circulating liquid contained in said trough and means for varying the flow of liquid in said trough relatively to the speed of rotation of said second mentioned means.

21. In a machine of the kind described, the combination of a pan having a trough, means for slicing and feeding a commodity to said trough, means rotatable at a constant speed for circulating liquid contained in said trough and valve means for varying the flow of liquid in said trough relatively to the speed of rotation of said second mentioned means.

22. In a machine of the kind described, the combination of a pan having a trough, means for slicing and feeding a commodity to said trough, means at said slicing and feeding means for conveying a commodity to said trough, means rotatable at a constant speed for circulating liquid contained in said trough and means for varying the flow of liquid in said trough relatively to the speed of rotation of said second mentioned means.

23. In a machine of the kind described, the combination of a pan having a trough, means for slicing and feeding a commodity to said trough, means rotatable at a constant speed for circulating liquid contained in said trough and means for varying the flow of liquid in said trough relatively to the speed of rotation of said second mentioned means, and means for accelerating flow of said liquid in said trough.

24. In a machine of the kind described, the combination of a pan having a trough, means for slicing and feeding a commodity to said trough, means rotatable at a constant speed for circulating liquid contained in said trough and valve means for varying the flow of liquid in said trough relatively to the speed of rotation of said second mentioned means, and means for accelerating flow of said liquid in said trough.

25. In a machine of the kind described, the combination of a pan having a trough, means for slicing and feeding a commodity to said trough, means for circulating liquid in said trough, means arranged relatively to the slicing and feeding means for conveying said commodity from said slicing means toward said trough, means for accelerating flow of liquid in said trough relative to the speed of operation of said means for circulating said liquid, said means for conveying said commodity from said slicing means forming part of said last mentioned means.

26. In a machine of the kind described, the combination of a pan having a trough, means for slicing and introducing a commodity to said trough, means for circulating liquid contained in said trough, means for conveying said commodity from said slicing means to said trough and at the position of discharge of said means for circulating liquid.

27. In a machine of the kind described, the combination of a pan having a trough, means for slicing and introducing a commodity to said trough, means for circulating liquid contained in said trough, means for varying the flow of said liquid relatively to the speed of operation of said circulating means, means for conveying said commodity from said slicing means to said trough and adjacent said means for circulating said liquid.

28. In a machine of the kind described, the combination of a pan having a trough, means for slicing and feeding a commodity to said trough, means for circulating liquid at a substantially constant speed in said trough, and means for effecting a variation of the speed of circulation of said liquid relative to the speed of operation of said circulating means.

THOMAS SHARP.